(12) United States Patent
Donato et al.

(10) Patent No.: US 12,315,185 B2
(45) Date of Patent: May 27, 2025

(54) OBJECT IDENTIFICATION USING SURFACE OPTICAL ARTIFACTS

(71) Applicant: ZEBRA TECHNOLOGIES CORPORATION, Lincolnshire, IL (US)

(72) Inventors: Daniel F. Donato, Johnsburg, IL (US); James J. O'Hagan, McHenry, IL (US); Tom D. Bianculli, Holtsville, NY (US); Stuart Peter Hubbard, Loughborough (GB)

(73) Assignee: Zebra Technologies Corporation, Lincolnshire, IL (US)

( * ) Notice: Subject to any disclaimer, the term of this patent is extended or adjusted under 35 U.S.C. 154(b) by 360 days.

(21) Appl. No.: 17/888,322

(22) Filed: Aug. 15, 2022

(65) Prior Publication Data

US 2023/0058995 A1    Feb. 23, 2023

Related U.S. Application Data

(60) Provisional application No. 63/234,146, filed on Aug. 17, 2021.

(51) Int. Cl.
| | |
|---|---|
| *G06T 7/70* | (2017.01) |
| *G06K 7/10* | (2006.01) |
| *G06K 19/077* | (2006.01) |
| *G06Q 10/087* | (2023.01) |
| *G06T 7/13* | (2017.01) |
| *G06V 10/22* | (2022.01) |
| *G06V 10/25* | (2022.01) |

(52) U.S. Cl.
CPC ............ *G06T 7/70* (2017.01); *G06K 7/10425* (2013.01); *G06K 19/07758* (2013.01); *G06Q 10/087* (2013.01); *G06T 7/13* (2017.01); *G06V 10/225* (2022.01); *G06V 10/25* (2022.01); *G06T 2207/30124* (2013.01); *G06V 2201/07* (2022.01)

(58) Field of Classification Search
USPC ........................................................ 382/103
See application file for complete search history.

(56) References Cited

U.S. PATENT DOCUMENTS

| | | | |
|---|---|---|---|
| 8,534,543 B1 * | 9/2013 | Eker | ...................... G06K 19/10 235/375 |
| 9,595,038 B1 | 3/2017 | Cavalcanti et al. | |
| 2006/0091221 A1 | 5/2006 | He et al. | |
| 2008/0271841 A1 | 11/2008 | Hansen | |

(Continued)

OTHER PUBLICATIONS

International Search Report and Written Opinion for International Application No. PCT/US2022/40372 mailed on Dec. 20, 2022.

(Continued)

*Primary Examiner* — Darryl V Dottin

(57) ABSTRACT

A method of object identification includes: capturing an image of an object having a material presenting surface artifacts; detecting a boundary within the captured image; selecting a portion of the image depicting the surface material within the boundary; based on the selected portion of the image, determining attributes of the surface artifacts; generating, based on the determined attributes of the surface artifacts, a physical identifier corresponding to the object; and storing the generated physical identifier.

1 Claim, 10 Drawing Sheets

(56) References Cited

U.S. PATENT DOCUMENTS

| | | |
|---|---|---|
| 2011/0096955 A1 | 4/2011 | Votoshyuoyskiy et al. |
| 2012/0243797 A1* | 9/2012 | Di Venuto Dayer .. H04N 23/56 382/218 |
| 2014/0160337 A1* | 6/2014 | Van Den Herik ..... G03B 13/26 348/333.1 |
| 2021/0183049 A1 | 6/2021 | Di Venuto Dayer, V et al. |

OTHER PUBLICATIONS

Novelty Search Report for Belgian Patent Application No. 2022/5642 mailed on May 15, 2023.

* cited by examiner

OBJECT IDENTIFICATION USING SURFACE OPTICAL ARTIFACTS

CROSS REFERENCE TO RELATED APPLICATION

This application claims priority from U.S. Provisional Application No. 63/234,146, filed Aug. 17, 2021, the contents of which is incorporated herein by reference.

BACKGROUND

Objects such as packages and printing supplies may be assigned identifiers, for example to distinguish one package from others, to enable monitoring of the progress of a package during transport and delivery, to facilitate automatic setting of printer settings, and the like. Such identifiers may be encoded in barcodes or microchips, or otherwise affixed to the objects. Under certain conditions, however, decoding a barcode to retrieve an identifier assigned to an object may be impeded by lighting, position of the object, or the like, thus complicating the identification of the object. Under certain conditions, affixing a unique predetermined identifier to an object may require time and labor increasing the cost of the object above an acceptable level. Further, an identifier assigned to one object may be erroneously affixed to a different object, again complicating object identification.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
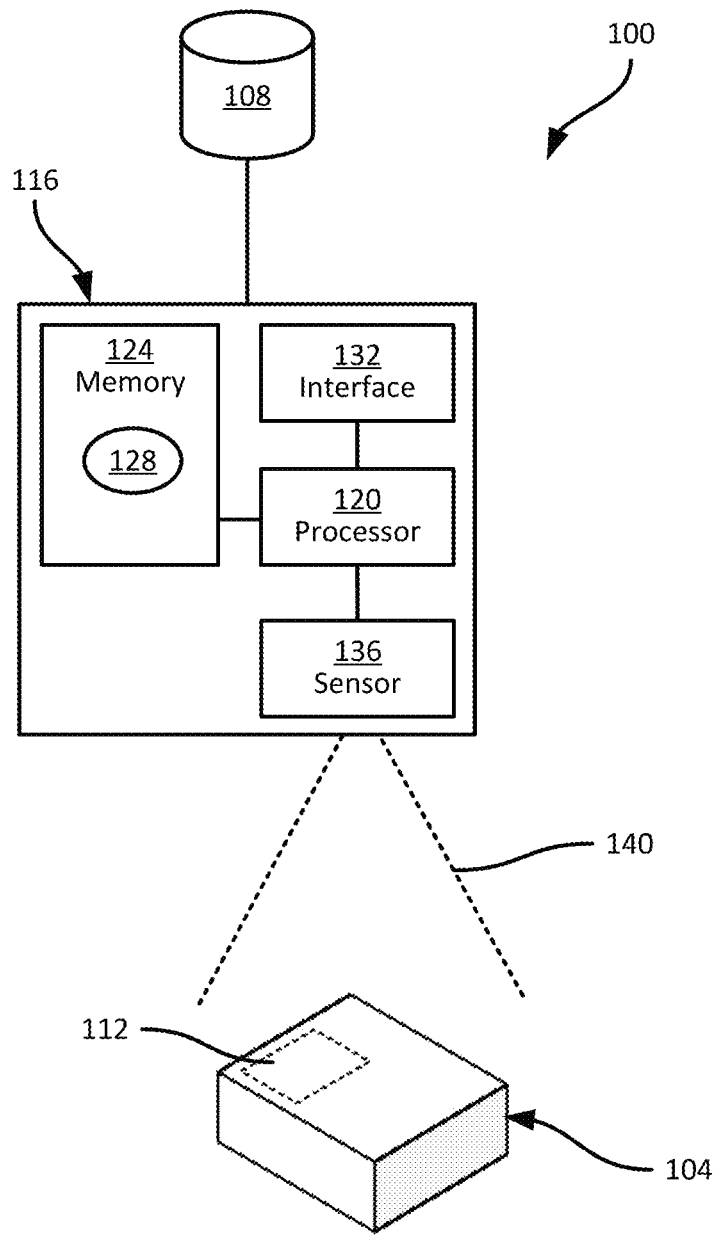
FIG. 1 is a diagram of a system for object identification using surface artifacts.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method of object identification, the method comprising: capturing an image of an object having a material presenting surface artifacts; detecting a boundary within the captured image; selecting a portion of the image depicting the surface material within the boundary; based on the selected portion of the image, determining attributes of the surface artifacts; generating, based on the determined attributes of the surface artifacts, a physical identifier corresponding to the object; and storing the generated physical identifier.

Additional examples disclosed herein are directed to a computing device, comprising: a memory; a sensor; and a processor configured to: control the sensor to capture an image of an object having a surface material presenting surface artifacts; detect a boundary within the captured image; select a portion of the image depicting the surface material within the boundary; based on the selected portion of the image, determine attributes of the surface artifacts; generate, based on the determined attributes of the surface artifacts, a physical identifier corresponding to the object; and store the generated physical identifier.

Further examples disclosed herein are directed to a label, comprising: a fibrous face stock member having surface artifacts; a uniform coating extending over a first portion of an outer surface of the face stock member, the coating configured for pigmentation responsive to a media processing operation; and a window in the coating, the window extending over a second portion of the outer surface distinct from the first portion to reveal the surface artifacts.

Still further examples disclosed herein are directed to a supply of labels, comprising: a fibrous liner layer having surface artifacts; a printable substrate layer comprising a plurality of labels separated by respective gaps; an adhesive between the fibrous liner layer and the printable substrate layer; and a data carrier encoding a physical identifier derived from at least one optical measurement of the surface artifacts of the liner layer within at least on of the gaps.

FIG. 1 illustrates a system 100 for object identification using surface optical artifacts including an object 104 having a region 112 displaying the artifacts and a computing device 116 configured to generate a physical identifier of the object 104 using the artifacts and to store the physical identifier in a repository 108. A wide variety of objects, such as packages for transport and delivery from origin locations (e.g., retailers) to destination locations (e.g., customer residences) are identified by one or more of product numbers, order numbers, tracking numbers, and the like. Generally referred to herein as assigned identifiers, those numbers (which need not be strictly numerical, but can also include alphanumeric strings, glyphs, or characters) can be assigned to objects in various ways that are outside the scope of the present discussion. The assigned identifier of an object 104 (e.g., a box or other parcel containing one or more items for shipment) can, for example, be stored in a repository 108 (e.g., hosted at a server or other network-connected computing device). The repository 108 can also store various other information corresponding to the object 104, such as dimensions of the object 104, a destination to which the object 104 is to be delivered (e.g., a mailing address), contents of the object 104, and the like.

During transit, handling, or the like, additional information can be collected and recorded in the repository 108, in association with the assigned identifier of the object 104. For example, transit locations (e.g., intermediate facilities between origin and destination), may associate the assigned identifier of the object with a condition of the object 104 and record the associated condition and timestamps in the repository 108 to track the shipment of the object 104. The assigned identifier can be affixed to the object 104 for retrieval during the collection of such additional information. For example, the assigned identifier can be printed on a label (e.g., in plain text, and/or encoded in a machine-readable indicium such as a barcode) affixed to a surface of the object 104, or applied directly to a surface of the object 104. In an embodiment, the assigned identifier can be printed directly on or near a surface of the object, such as ink jet marking the surface of a box or thermally printing a heat receiving area near a substrate surface but covered by a protective varnish or laminate. In an embodiment the assigned identifier can be stored in a radio frequency identification (RFID) tag affixed to or incorporated into the object 104.

Under certain conditions, however, retrieving the assigned identifier from the object 104 may be impeded. For example, during loading of the object 104 into a vehicle for delivery, a camera or other sensor mounted in the vehicle, or operated by a driver of the vehicle, may capture images of the object 104. The images may omit the assigned identifier, or partially include the assigned identifier. In other cases, the images may encompass the portion of the object 104 bearing the assigned identifier, but lighting or other conditions may prevent accurate decoding or other extraction of the assigned identifier. In such examples, the object 104 may be inaccurately identified, or identification of the object 104 (i.e., retrieving the assigned identifier of the object 104) may fail. Updating status information for the object 104 in the repository 108 may therefore also fail. Similarly, a camera positioned to capture images of objects carried by a conveyor may decode a first assigned identifier from a first barcode on a top surface of a first object but may be unable to decode a second assigned identifier from a second barcode on the bottom surface of a second object.

In a scenario, high speed converting equipment producing die cut labels or corrugated cardboard boxes may require additional equipment or secondary handling to add unique identifiers to each label or box. For such objects, the additional cost of marking a unique identifier may outweigh the value obtained from use of the unique identifier.

In a scenario, the assigned identifier corresponding to the object 104 may be affixed to a different object, whether in error or maliciously (e.g., in connection with a counterfeit object). Because the assigned identifier generally does not have an inherent association with the object, it may be difficult to detect that the assigned identifier has been affixed to an object different from the object 104 to which the assigned identifier was originally associated.

The system 100 therefore includes certain components and functionality to augment identification of the object 104, using physical attributes of the object 104. The object 104, as discussed in greater detail below, includes a surface material that can be sensed (e.g., imaged) by sensors exterior to the object 104 and presents surface artifacts in at least one region 112. In proximity to the surface artifacts is a cut or printed boundary. A computing device 116 is configured to generate a physical identifier of the object 104 associated with the appearance of the physical artifacts relative to the boundary. The physical identifier can then be stored in the repository 108 in association with the assigned identifier. The physical identifier can subsequently be employed to identify an object 104 not carrying the assigned identifier, and/or to authenticate the object 104 (e.g., to ensure that an object bearing the assigned identifier is the same as the original object to which the assigned identifier was assigned), and/or to identify the object 104 in the absence of sensor data, such as a captured image or RFID tag read, enabling extraction of the assigned identifier.

The computing device 116 can be implemented as a mobile computing device (e.g., a barcode scanner, a mobile computer, a mobile printer, or the like), a fixed computing device deployed in a delivery vehicle, object handling facility, or the like. In some examples, the computing device 116 can be implemented as a media processing device such as a label printer, receipt printer, wristband printer, smart-label printer-encoder, ID card reader, ID card printer, thermal printer, inkjet printer, offset printer, flexographic printer, or the like. The computing device 116 includes, in the illustrated example, a processor 120, such as a central processing unit (CPU), a graphics processing unit (GPU), or a combination thereof. The processor 120 is communicatively coupled with a non-transitory computer-readable storage medium such as a memory 124, implemented as a suitable combination of volatile and non-volatile memory elements. The memory 124 can store a plurality of computer-readable instructions, e.g., an object identification application 128 executable by the processor 120 to perform functionality discussed in greater detail below. The application 128, in other examples, can be implemented as a suite of distinct applications, or as a dedicated hardware element (e.g., an application-specific integrated circuit (ASIC)).

The computing device 116 also includes a communications interface 132 enabling communication between the device 116 and other computing devices (e.g., a server hosting the central repository 108), via suitable short-range links, local area or wide area networks, and the like. The interface 132 includes suitable hardware elements, executing suitable software and/or firmware, to communicate with such other computing devices.

The computing device 116 includes, or is otherwise communicatively coupled with, a sensor 136 such as a camera (e.g., configured to capture visible light, and/or light outside the visible spectrum, such as infrared or ultraviolet light). The sensor 136 can also include other optical sensors in addition to or instead of the camera, such as one or more light emitters and photodiodes arranged to measure intensity of light from the emitter(s) reflected by an object within a field of view (FOV) 140 of the sensor 136, transmitted through the object, and/or fluoresced by the object.

As discussed in greater detail below, the computing device 116 is configured to capture an image of the object 104 (including any one or more of a two-dimensional pixel array, a linear array of intensity measurements, an array obtained by digitizing an analog sensor measurement, and the like). The computing device 116 is further configured to generate, from the captured image, a physical identifier of the object 104. The physical identifier enables the computing device 116 itself, or other sensor-equipped computing devices, to identify and/or authenticate the object 104.

Figure 2:
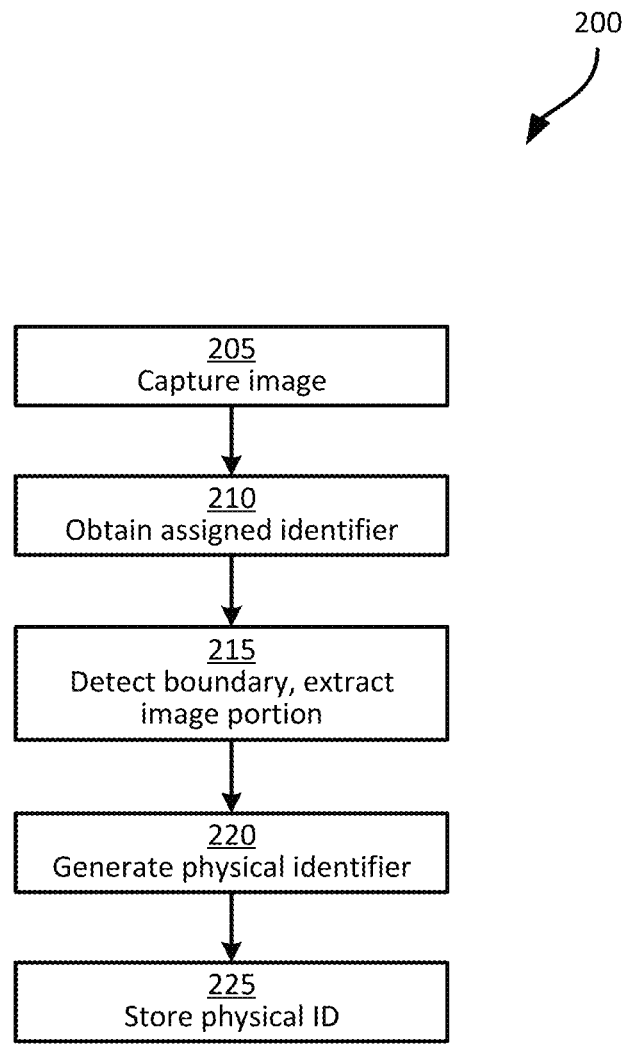
FIG. 2 is a flowchart of a method for object identification using surface artifacts.

Turning to FIG. 2, a method 200 of object identification using surface optical artifacts is illustrated. The method 200 is described below in conjunction with its example performance within the system 100, (e.g., by the computing device 116).

At block 205, the computing device 116 is configured to capture an image of the object 104. The computing device 116 can, for example, control the sensor 136 to capture the image. As noted above, the image can include a two-dimensional array of pixels (e.g., with each pixel containing color and/or intensity values). In other examples, the image can include a one-dimensional profile including a series of intensity measurements corresponding to a particular portion of the object 104. For example, in embodiments in which the computing device 116 is implemented as a converting press or a label printer, the device can include an optical sensor along the media path from a media supply chamber to a print head, and the image can include a series of intensity measurements (e.g., of reflected or transmitted light) taken as a web of labels travels past the sensor 136.

In an embodiment, the web of labels may include a strip of liner material, adhesive, and label material. Individual labels are die cut from the label material and cut material is removed during the label converting process. The resulting web of labels includes a continuous strip of liner with a repeating pattern of adhesive labels separated by gap areas. The boundary of a gap area is defined as the die-cut trailing edge of a first label to the die-cut leading edge of the subsequent label. The surface material presenting surface artifacts is the exposed liner presented within the label gap area. In this embodiment each measurement in the series may correlate to sensor measurements from a portion of the web within the gap areas. Because a roll of 1000 labels may include 999 gap areas measurable by the sensor 136, the physical identifier of the web of labels may be generated from sensor measurements from one or more gap areas. Due to random variation in the liner paper fibers, sensor measurements from different gap areas on the same web may vary, even though the gap dimensions are consistent. However the sequence of those sensor measurements would remain consistent each time the measurement process is repeated. A second web of labels with similar liner cut from an identical die would have different random variations in the liner paper fibers, such that the first physical identifier for the first web of labels would differ from the second physical identifier for the second web of labels even if each were measured in the same way and even though the measurement for each distinct web of labels is repeatable.

At block 210, the computing device 116 is configured to obtain the assigned identifier of the object 104. The performance of block 210 can, in other examples, occur prior to block 205, or later in the method 200. Obtaining the assigned identifier can include receiving the assigned identifier as input data, e.g., via a keyboard or other input assembly of the computing device 116. Obtaining the assigned identifier can also include detecting and decoding a barcode or other machine-readable indicium, e.g., on a label affixed to the object 104. The machine-readable indicium can be detected and decoded from the image captured at block 205 in some examples. In other examples, the computing device 116 can obtain a separate image, optionally from a sensor distinct from the sensor 136, and detect and decode the machine-readable indicium from the separate image. In some examples, e.g., in which the method 200 is performed in conjunction with a loading operation for a delivery vehicle, the image can be captured at block 205 by a camera disposed within or adjacent to the vehicle, and the assigned identifier can be received from an RFID reader or barcode scanner also associated with the vehicle.

Figure 3:
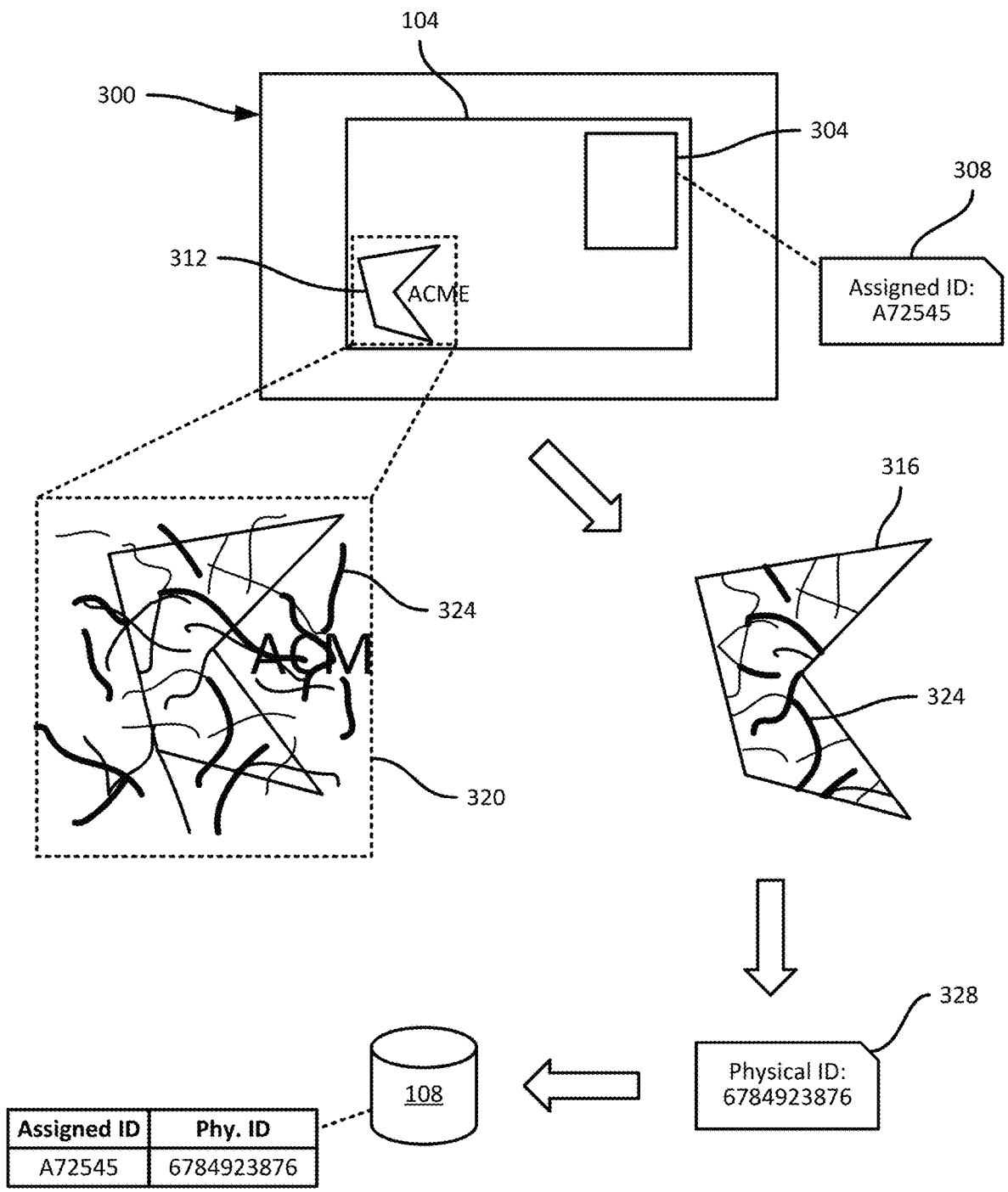
FIG. 3 is a diagram illustrating an example performance of the method of FIG. 2.

Turning to FIG. 3, example performances of blocks 205 and 210 are illustrated. An image 300 captured by the sensor 136 is shown, depicting a surface of the object 104. The surface depicted in the image 300 includes a label 304 that includes a machine-readable indicium, from which the computing device 116 can decode an assigned identifier 308 (e.g., the string "A72545" in this example). The captured image may include only at least a portion of the surface including the machine-readable indicium, or it may stitch together multiple images captured by the sensor 136 to produce the image 300 from which the assigned identifier 308 is decoded. The assigned identifier 308 is also stored in the repository 108, along with other information corresponding to the object, such as dimensions, a delivery address, product name(s) and count(s), and the like.

Returning to FIG. 2, at block 215, having captured the image 300 and obtained the assigned identifier 308, the computing device 116 is configured to select a portion of the image 300 from block 205 for further processing. The selected portion of the image depicts a surface material of the object 104. The surface material can include a surface material of a box forming at least portion of the object 104 (e.g., a cardboard box), a surface material of the label 304 affixed to the box, or the like. The computing device 116 can be configured, to select a portion of the image 300, to detect a boundary presented on a surface of the object 104, and to extract the portion of the image 300 within the boundary.

Referring again to FIG. 3, the object 104 includes a graphic 312 printed or otherwise applied to a box of the object 104. The graphic 312 can be a portion of a corporate logo, asymmetric mark, compliance symbol, glyph, and/or the like. In an embodiment, the graphic 312 may be printed or otherwise applied to the box along with other text or graphics such that no secondary handling is required. In addition, the graphic 312 defines a boundary enclosing a portion of a surface of the box, i.e., separating the surface inside the boundary from the surface outside the boundary. The graphic 312 can be applied with a visible pigment in some examples, but in other examples can be applied with a pigment that is detectable by the sensor 136, but is not visible to a human. The computing device 116 can detect the graphic 312 by any suitable method, e.g., by applying computer vision feature detection techniques, by determining contrast in image intensity within the captured image 300, by retrieving from memory a boundary definition specifying the shape or distances of the graphic 312. Having detected the graphic 312, the computing device 116 is configured to extract the portion of the image falling within the boundary defined by the graphic 312. In the example of FIG. 3, therefore, the computing device 116 is configured to extract a portion 316 of the image 300.

As shown in FIG. 3, the surface material of the object 104 (at least within the boundary set out above) presents surface artifacts, which have an arrangement that is random and therefore specific to each object 104. In the illustrated example, the surface material is fibrous, such as paper, cardboard, Tyvek, or another suitable paper substrate. Cardboard and paper can be fabricated from wood fiber, but other sources of fiber can also be employed to manufacture cardboard and paper materials. For example, the fibrous materials presenting surface artifacts as discussed herein can include can also include combinations of wood-fiber materials with polymers, textiles (e.g., cotton, linen) or the like. Such fibrous materials may also be referred to as "paper", despite containing little or no wood fiber. As shown in the detailed view 320 of the graphic 312, the lengths, color, and orientations of individual fibers 324 can vary widely. The variation in fiber length and orientation is generally randomized as a result of the manufacturing processes used to fabricate the surface material. That variation may be inherent in the manufacturing process requiring no secondary handling to create. The fibers, in other words, are surface artifacts that can be employed to generate a physical identifier specific to the object 104

Referring again to FIG. 2, at block 220, the computing device 116 is configured to generate a physical identifier corresponding to the object 104 based on measurement of the surface artifacts Because a large number of surface artifacts are possible, the generated physical identifier is unlikely to repeat in a small population of objects. Either decreasing the quantity of objects in the population or increasing the precision of the measurement will further decrease the likelihood of the generated physical identifier repeating within the population of objects, so sensors with less sensitivity or precision may be used in applications requiring only limited uniqueness. In particular, the computing device 116 can be configured to determine at least one attribute of the surface artifacts (e.g., of the fibers within the boundary defined by the graphic 312, in the example of FIG. 3), and to generate the physical identifier based on the determined at least one attribute.

Examples of attributes determined at block 220 include fiber length and orientations as noted above. Further example attributes include fiber thickness, fiber color, intensity of light reflected from the fibers, intensity of light transmitted through the fibers, intensity of light emitted by fluorescent fibers, and the like. For example, the computing device 116 can determine a portion of the surface area within the boundary that is occupied by fibers of a certain color, thickness, or combination thereof. The portion can be used as an input to a hashing function to generate a physical identifier such as a numerical string. A wide variety of other features can be derived from the attributes of the surface artifacts, and combined to produce a physical identifier. In an embodiment, only a portion of the image 300 within the boundary proximate the graphic 312 may be measured to generate the physical identifier; for example, the sequence of thin fibers and wide fibers intersecting the border of the graphic 312 may be used to generate the physical identifier. In an embodiment, a portion of the image 300 extending across the graphic 312 may be measured to generate the physical identifier; for example, the intensity profile of the image extending from a first border edge of the graphic 312 past a plurality of fibers with various optical characteristics to a second border edge of the graphic 312 may be measured to generate the physical identifier. In the example shown in FIG. 3, the computing device 116 generates a physical identifier 328 in the form of the string "6784923876". The physical identifier is referred to as "physical identifier", in contrast with the assigned identifier, because the physical identifier 328 reflects inherent physical characteristics of the object 104 that are generally difficult to duplicate because of the random arrangement of the surface artifacts.

At block 225, in response to generating the physical identifier 328, the computing device 116 is configured to store the physical identifier. In some examples, at block 225 the computing device 116 is configured to associate the assigned identifier 308 and the physical identifier 328. Associating the assigned identifier and the physical identifier can include storing the assigned identifier and the physical identifier together (e.g., in a data record) locally in the memory 124 and/or transmitting the physical identifier to another computing device for storage thereon. For example, the computing device 116 can update the repository 108 to store the physical identifier 328 in association (e.g., in the same data record) with the assigned identifier 308, as shown in FIG. 3. In other examples, associating the physical and assigned identifiers need not involve long-term storage. For example, in embodiments in which the computing device 116 tracks motion of the object 104 over a relatively short timeframe (e.g., up to five minutes, up to the completion of a device activity, up until a battery of the device is discharged), the assigned and physical identifier can be maintained in memory 204 only until position tracking of the object 104 is complete, following which time the physical identifier can be discarded and the final detected position of the object 104 stored persistently in association with the assigned identifier. In further examples, storing the physical identifier at block 225 can include writing the physical identifier to a data carrier, e.g., by writing the physical identifier to an RFID tag or printing the physical identifier on a label in plain text and/or encoded in a barcode. In still further examples, at block 225 the computing device 116 can store the physical identifier independently of an assigned identifier, e.g., by writing the physical identifier to the data carrier, which is affixed to or an integral part of the object 104 itself. In such examples, block 210 can be omitted.

As such, performance of the method 200 generates a physical identifier 328 that is based on inherent physical attributes of the object 104, and that can be regenerated later from a further image of the object 104 but that is difficult to reproduce without the object 104.

Figure 4:
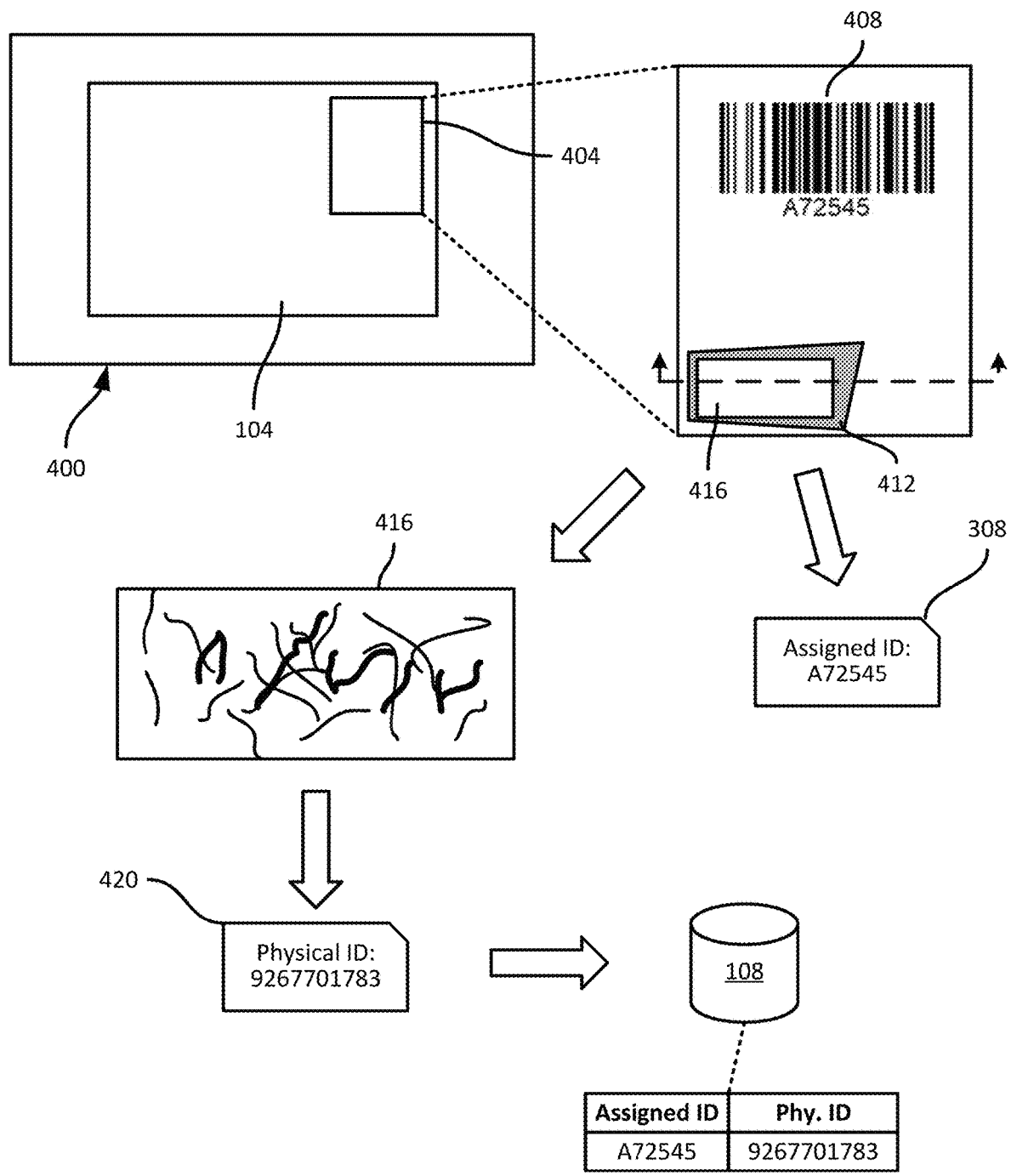
FIG. 4 is a diagram illustrating another example performance of the method of FIG. 2.

FIG. 4 illustrates another example performance of the method 200, in which the surface material is provided on a label affixed to a box of the object 104, rather than on the box itself. In the example of FIG. 4, at block 205 the computing device 116 captures an image 400 of the object 104, in which a label 404 is visible. The label 404 can include a machine-readable indicium 408 (e.g., a barcode or RFID tag) encoding the assigned identifier. The label 404 also includes a graphic 412 defining a boundary that encloses a portion 416 of the label 404.

At block 210, the computing device 116 is configured to decode the assigned identifier 308 from the indicium 408. At block 215, the computing device 116 is configured to extract the portion 416 from the image 400. As discussed in connection with FIG. 3, the portion 416 depicts surface artifacts such as fibers with random lengths, orientations, and the like. From the portion 416, the computing device 116 determines at least one attribute of the surface artifacts, and at block 220, generates a physical identifier 420. At block 225, the computing device 116 updates the repository 108 to store the physical identifier 420 in association with the assigned identifier 308.

Figure 5:
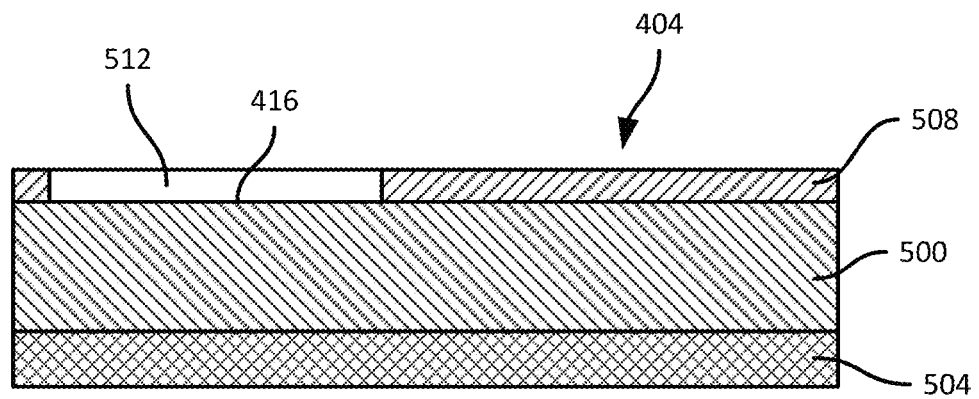
FIG. 5 is a cross sectional view of the label of FIG. 4.

FIG. 5 illustrates a cross-section of the label 404 taken at the dashed line over the label 404 in FIG. 4. The label 404 includes a face stock member 500, e.g., made of paper or another suitable fibrous material displaying surface artifacts such as the fibers mentioned in connection with FIGS. 3 and 4. The face stock 500 is affixed to an adhesive layer 504 configured to adhere to a box or other portion of the object 104. The adhesive layer 504 may, prior to placement of the label 404 on the box, be removably disposed on a liner or web carrying a plurality of labels.

The label 404 further includes a coating 508 on a surface of the face stock 500 opposite the adhesive 504. The coating 508 is uniform, in that the coating 508 exhibits fewer surface artifacts than the face stock 500 itself. The coating 508 is generally configured to accept and retain pigment, and/or can contain thermally activated pigment (e.g., for labels suitable for thermal printing).

To enable the label 404 to be used for the generation of a physical identifier, the label 404 includes a window or gap 512 in the coating 508, to expose a portion of the face stock 500. As shown in FIG. 5, the portion of the face stock 500 exposed by the window 512 coincides with the portion 416 from which the physical identifier 420 was derived in the example of FIG. 4. In other implementations, the portion 416 can be covered by a different coating (e.g., transparent to the light to which the sensor 136 is configured to collect), rather than being exposed.

The examples of FIGS. 3 and 4 can be combined in some examples. That is, the object 104 can include more than one boundary, and the computing device 116 can therefore generate more than one physical identifier for the object 104. Each generated physical identifier is stored in association with the same assigned identifier, e.g., in the repository 108. The use of multiple physical identifiers may facilitate the subsequent capture of at least one physical identifier for identification and/or authentication, e.g., when only some surfaces of the object 104 are visible to a sensor.

Figure 6:
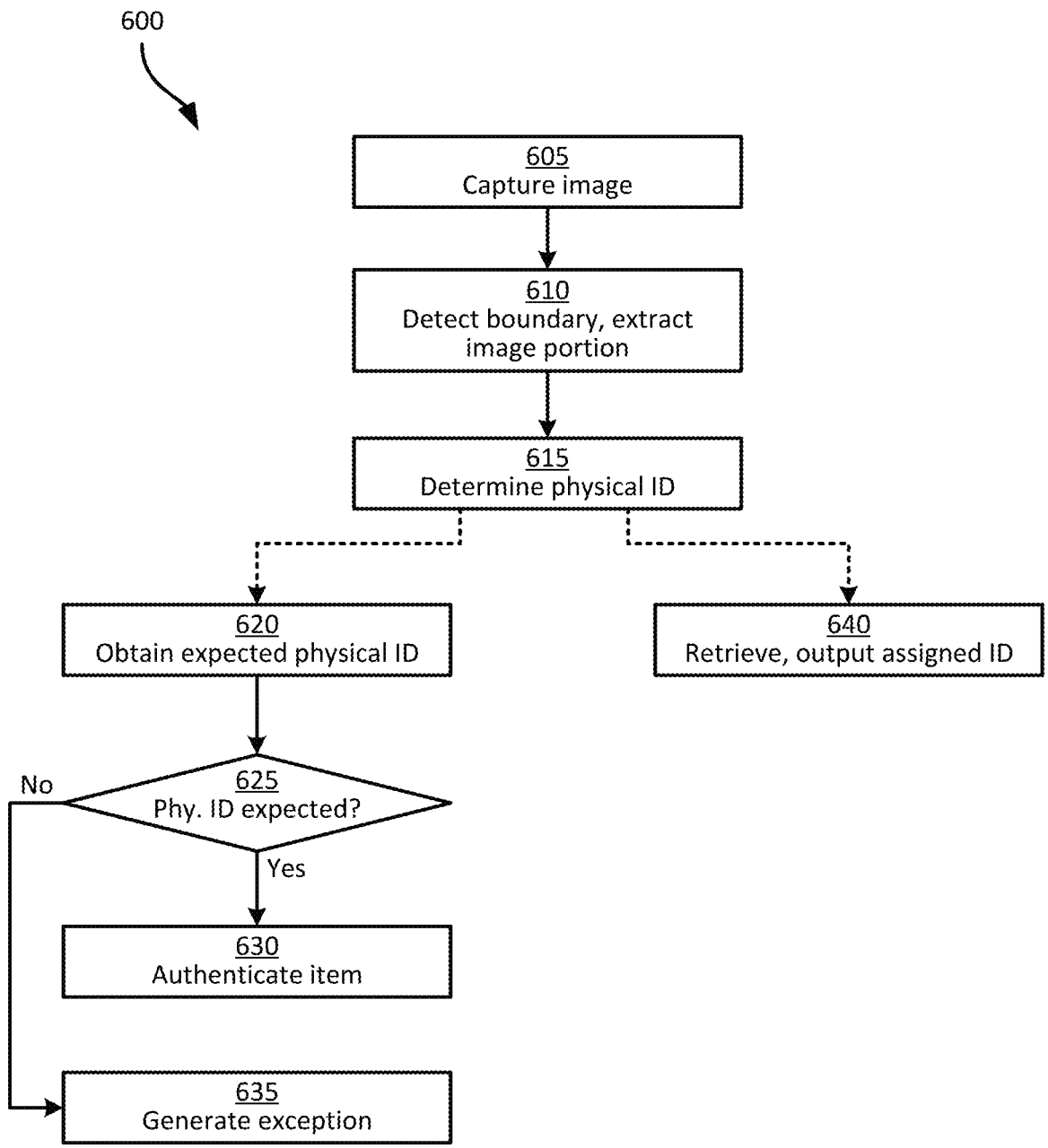
FIG. 6 is a flowchart of a method for object identification or authentication using physical identifiers.

In further embodiments, e.g., in which the image captured at block 205 includes a series of intensity measurements (e.g., of reflected or transmitted light) corresponding to gaps between labels, taken as a web of labels travels past the sensor 136 prior to placement of the labels in a roll or fan-fed box, the boundary used at block 215 can be set by the manufacturing apparatus (e.g., a converting press) along which the web of labels travels. That is, the sensor 136 can be positioned over a predetermined portion of the path the web travels along. The physical identifier generated at block 220 in such examples can include a string generated from at least one of the intensity measurements. For example, a physical identifier can be generated for a roll of labels by combining the intensity measurements from a plurality of gaps between the labels in the roll. In an embodiment, a physical identifier can be generated for a roll of labels by combining a plurality of intensity measurements captured across a single gap. Turning to FIG. 6, a method 600 of employing the physical identifier generated via the method 200 for object identification and/or authentication is illustrated. The method 600 can be performed by the computing device 116 (e.g., at a later point in time than the method 200), or by another computing device equipped with a sensor as described in connection with the sensor 136. The performance of the method 600 will be described below as being performed by the computing device 116, for illustrative purposes.

At block 605, the computing device 116 is configured to capture an image of an object 104, as described in connection with block 205. For example, the image captured at block 605 can be an image of an object bearing the same assigned identifier as the object 104 shown in the image 300. It may not yet be known, however, whether the object shown in the image from block 605 is the object 104 from which the physical identifier 328 was derived. At block 610, therefore, the computing device 116 is configured to select a portion of the image from block 605, and at block 615 the computing device 116 is configured to determine a physical identifier from the portion selected at block 610. The performances of blocks 610 and 615 are as described above in connection with blocks 210 and 215.

Figure 7:
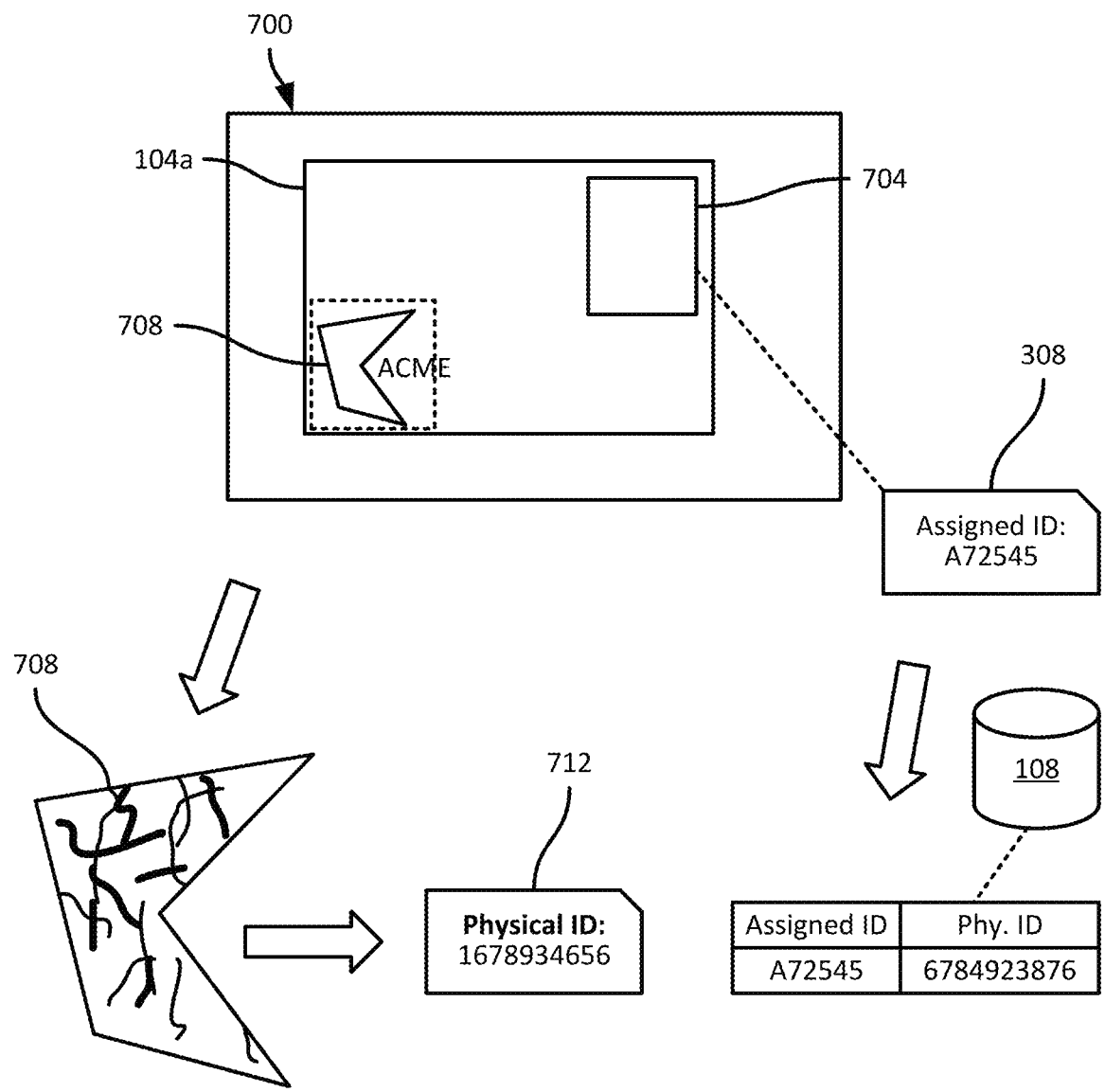
FIG. 7 is a diagram illustrating an example performance of the method of FIG. 6.

Turning to FIG. 7, an image 700 is shown, having been captured at block 605 and depicting a candidate object 104a bearing a label 704. The computing device 116 can be configured, at block 610, to extract a portion of the image within a boundary 708, and to generate a physical identifier 712 based on at least one determined attribute of the surface artifacts within the extracted portion.

Returning to FIG. 6, the physical identifier 712 determined at block 615 can be employed to identify the object 104a, and/or to authenticate the object 104a. To authenticate the object 104a, the computing device 116 proceeds to block 620. At block 620, the computing device 116 is configured to retrieve an expected physical identifier for the object 104a. To retrieve the expected physical identifier, the computing device 116 can obtain an assigned identifier from the object 104a, e.g., by decoding a machine readable indicium on the label 704. FIG. 7 shows that the assigned identifier 308 is obtained from the label 704. For example, the label 704 may encode the same data as the label 304 shown in FIG. 3.

Using the assigned identifier 308, the computing device 116 can retrieve the expected physical identifier for the object 104a from the repository 108, the memory 204, or another storage device. In other examples, the computing device 116 can obtain the expected physical identifier from the object 104a. For example, in some embodiments the physical identifier generated at block 220 is printed (at block 225) on the object 104a, written to an RFID tag affixed to the object 104a, or the like. In those embodiments, the computing device 116 can decode or otherwise read the expected physical identifier at block 620 from the RFID tag, barcode, or the like.

At block 625, the computing device 116 is then configured to compare the physical identifier determined from block 615 with the expected physical identifier obtained from block 620. When the physical identifiers from blocks 615 and 620 match, the computing device 116 is configured to authenticate the object 104a at block 630. That is, at block 630 the computing device 116 has verified that the object 104a is the same physical object as the object 104. The computing device 116 can generate an authentication notification, generate an event, store the verification to memory, provide indication to a user, continue with a processing operation, or the like.

When the determination at block 625 is negative, however, as is the case in the example of FIG. 7 (because the determined physical identifier 712 does not match the physical identifier obtained from the repository 108), the computing device 116 is configured to proceed to block 635. At block 635, the computing device 116 is configured to generate an exception, e.g. by notifying an operator or another computing device that the object 104a is not authenticated. That is, the exception indicates that the object 104a is not the same physical object as the object 104, despite bearing the same assigned identifier. The object 104a may therefore be a counterfeit, or may have been improperly processed.

As noted above, the computing device 116 can also use the physical identifier determined from block 615 to retrieve an assigned identifier, for example when the assigned identifier cannot be obtained from the object 104a (e.g., because the label is obscured). At block 640, the computing device 116 can query the repository 108 for the assigned identifier corresponding to the physical identifier determined from block 615. Upon obtaining an assigned identifier, the computing device 116 can output the assigned identifier, e.g., to a position tracking application that captures a sequence of images and tracks the position of the object 104 therein.

Figure 8:
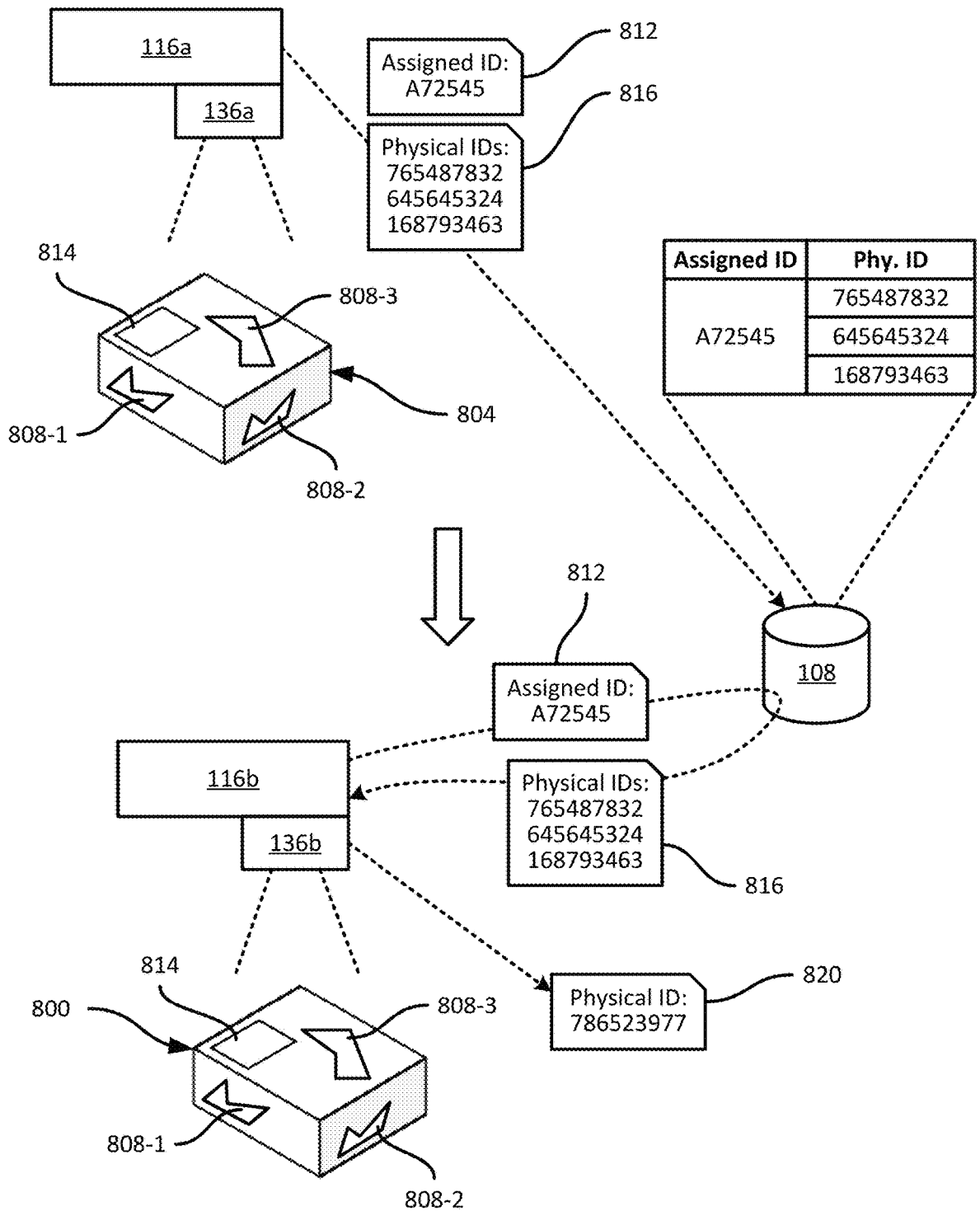
FIG. 8 is a diagram illustrating an example performance of the methods of FIG. 2 and FIG. 6.

Turning to FIG. 8, an example implementation of the methods 200 and 600 is shown to authenticate a candidate object 800. A computing device 116a, via control of a sensor 136a, is configured to perform the method 200. For example, the sensor 136a can capture one or more images of an object 804 (at block 205) having boundaries 808-1, 808-2, and 808-3 on respective faces thereof. The object 804 can include one or more boundaries 808 on each face. The object 804 may, for example, be presented to the sensor 136a in a plurality of orientations for the capture of images depicting each of the boundaries 808. At block 210, the computing device 116a can also obtain an assigned identifier 812, e.g., by detecting and decoding a barcode from a label 814 in the images, by receiving the assigned identifier 812 from an RFID reader, or the like. At blocks 215 and 220, the computing device 116a is configured to generate a physical identifier for each of the graphics 808 (that is, a physical identifier derived from the surface artifacts displayed by fibrous material of the object 804 within the boundaries 808). The computing device 116a can then store, at block 225, the physical identifiers 816, e.g., by sending the physical identifiers 816 and the assigned identifier 812 to the repository for storage.

Subsequently, e.g., in response to arrival of the candidate object 800 at a handling facility or the like, a further computing device 116b can be configured to perform the method 600 to authenticate the candidate object 800. For example, via blocks 605 to 615, the computing device 116b can control the sensor 136b to capture one or more images. For example, the sensor 136b can capture an image depicting the boundary 808-3 (and the label 814). From the captured image, the computing device 116b can determine (at block 615) a physical identifier 820. At block 620, the computing device 116b can determine the assigned identifier 812, e.g., from the captured image, and use the assigned identifier 812 to query the repository for expected physical identifiers 816. The computing device 116b can then compare the determined physical identifier 820 to the expected physical identifiers at block 625. As shown in FIG. 8, the determined physical identifier 820 does not match any of the expected physical identifiers 816, and the computing device 116b generates an exception at block 635, e.g., indicating that the candidate object 800 is not the same object as the object 804, despite bearing the same assigned identifier 812.

Figure 9:
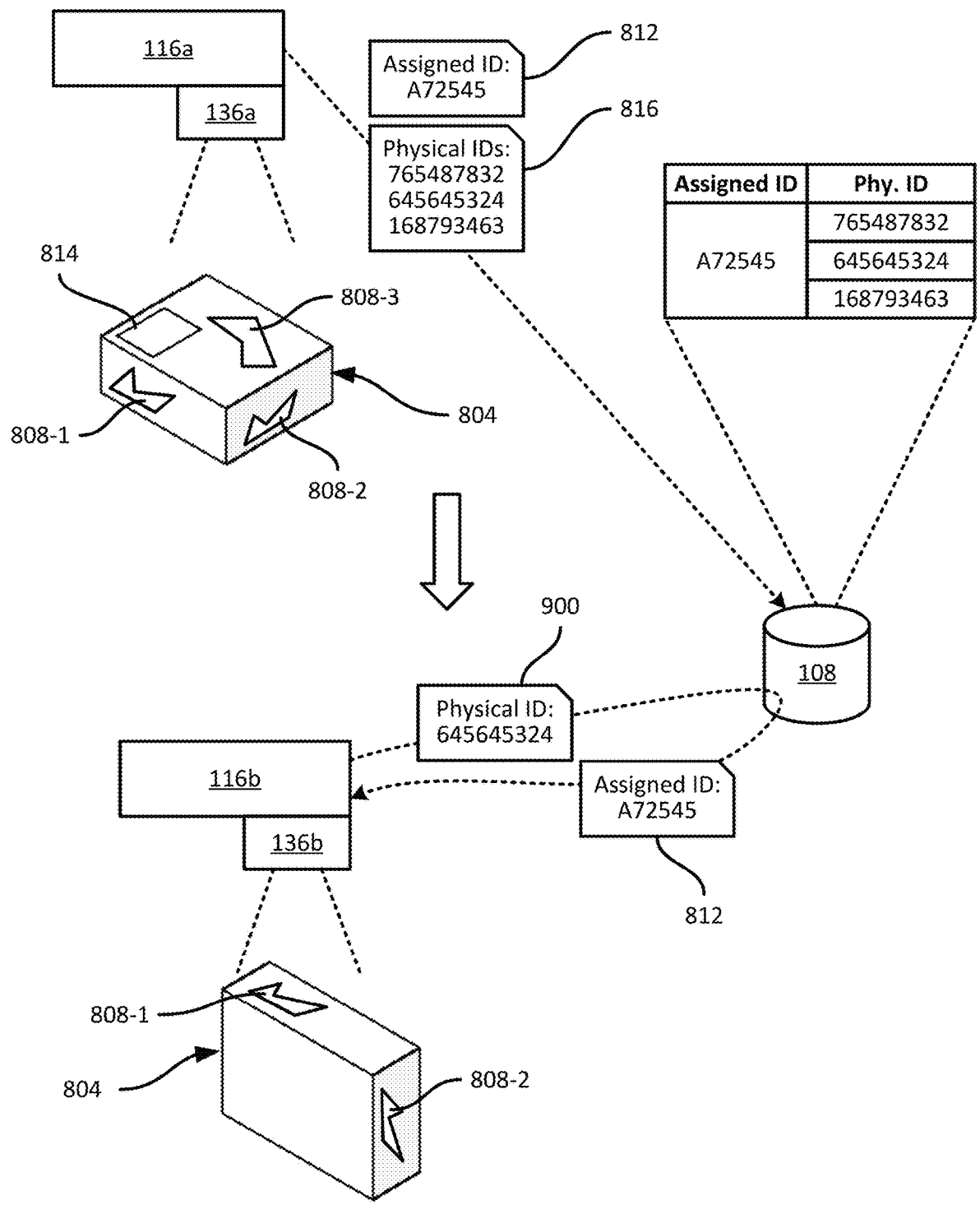
FIG. 9 is a diagram illustrating another example performance of the methods of FIG. 2 and FIG. 6.

FIG. 9 illustrates another example performance of the methods 200 and 600 to identify the object 804, e.g., at distinct stages in the transport and/or handling of the object 804. As described in connection with FIG. 8, via the performance of the method 200, the computing device 116a can generate the physical identifiers 816 and store the physical identifiers 816 in association with the assigned identifier 812 in the repository 108. In other examples, the association between the physical identifiers 816 and assigned identifier 812 can be stored in the local memory of the computing device 116a.

In response to arrival of the object 804 at a handling facility or the like, the computing device 116b can capture an image of the object 804 and determine a physical identifier 900 from the image, via blocks 605 to 615. Due to the orientation of the object 804, obstructions between the object 804 and the sensor 136b, or other imaging conditions, the image(s) captured by the sensor 136b may not depict the label 814, and the assigned identifier 812 may not be derivable directly from the captured image(s). The computing device 116b can, at block 640, query the repository 108 (or local memory, in some examples) using the determined physical identifier 900, and retrieve the assigned identifier 812 (since the determined physical identifier 900 matches one of the physical identifiers 816 previously generated by the computing device 116a).

Figure 10:
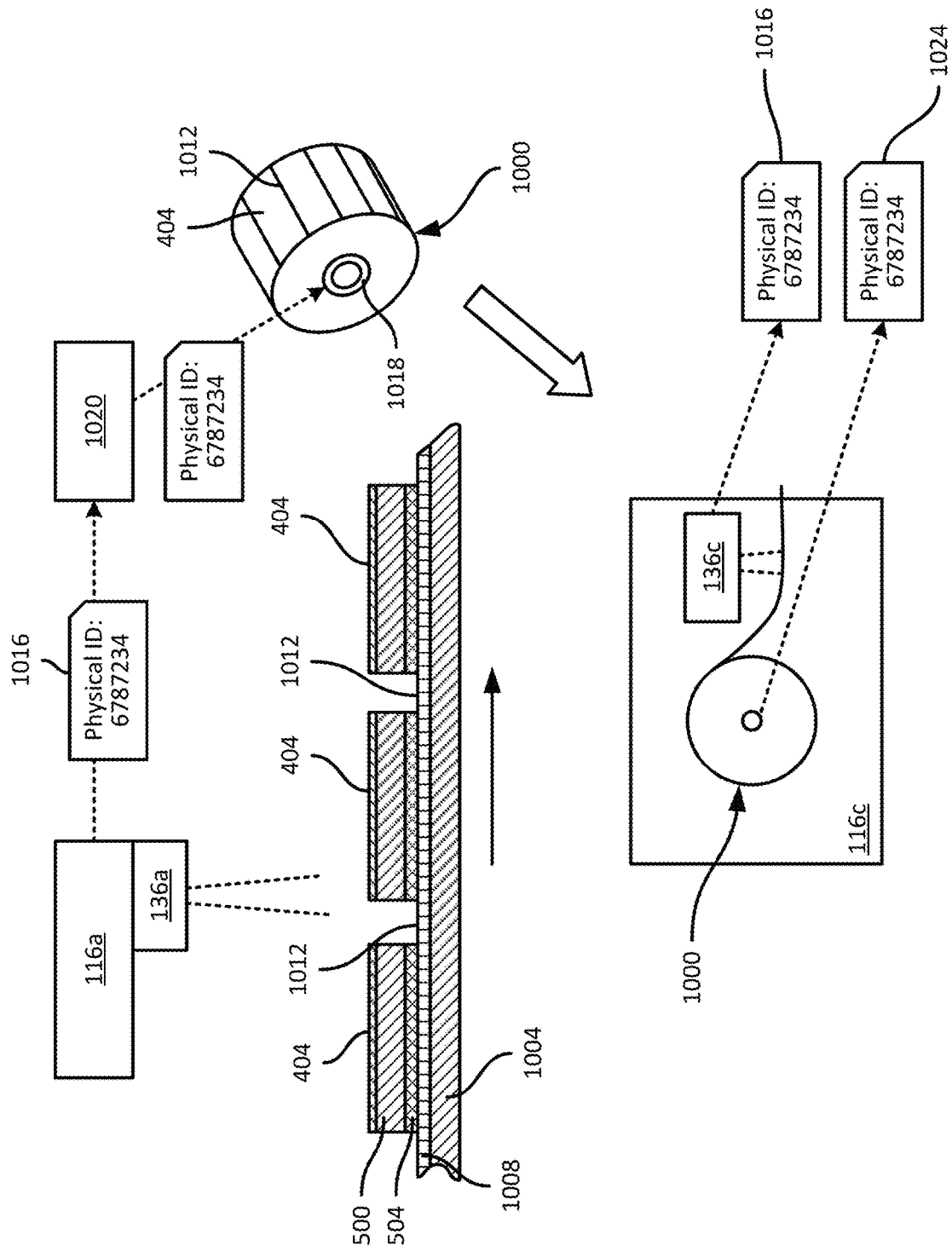
FIG. 10 is a diagram illustrating a further example performance of the methods of FIG. 2 and FIG. 6.

FIG. 10 illustrates a further example performance of the methods 200 and 600 to authenticate a supply of labels 1000, such as a roll of labels. The roll can be produced by converting equipment producing die cut labels that are then spooled to produce the roll 1000. FIG. 10 shows a partial cross section of the labels prior to rolling, in which a plurality of labels 404 (as described earlier in connection with FIG. 4, although the boundary 412 and window 512 may be omitted) formed by a paper substrate layer 500 with an adhesive backing 504. The adhesive 504 lies between the paper substrate and a liner layer 904, e.g., a fibrous liner such as paper or another suitable material. The web of labels may include a layer 1008 between the fibrous liner 1004 and the adhesive 504, e.g., a layer of silicone to facilitate removal of the labels 404 from the liner 1004 for use.

Between each label 404, the web includes a gap 1012 at which the liner 1004 is visible through the translucent or transparent layer 1008. A computing device 116a, e.g., mounted over a portion of the production line that the web travels past, can capture images of one or more of the gaps 1012 (up to and including all of the gaps 1012 for a given web), and generate a physical identifier 1016 for the supply 1000, or a series of physical identifiers (e.g., one per gap 1012). The computing device 116a can transmit the physical identifier 1016 to a marking apparatus 1020, configured to encode the physical identifier 1016 in a data carrier on the supply 1000. The data carrier can be an RFID tag, e.g., affixed to a core 1018 of the supply 1000. The data carrier can also be a barcode applied to the supply 1000. The RFID tag or barcode may be affixed to the inside of the core 1018, the end of the core 1018, the surface of the core adjacent the label web, manufactured into the core 1018, or affixed to a cartridge associated with the supply. In an embodiment the data carrier may be printed on the inside of the core 1018, the end of the core 1018, the surface of the core adjacent the label web, the liner 1004, the label 404, or a cartridge associated with the supply.

Following manufacture of the supply 1000, the supply 1000 can be installed in a further computing device 116c such as a printer, having a sensor 136c disposed along a media path. As the media is fed from the supply 1000 to a print head or other media processing element(s) in the device 116c, the sensor 136c can capture image(s) of the gaps 1012 (i.e., performing blocks 605 to 615) and thereby determine a physical identifier 1024. The device 116c can also, at block 620, obtain an expected physical identifier (i.e., the physical identifier 1016) from the data carrier mentioned above. At block 625, the device 116c can compare the expected physical identifier 1024 with the determined physical identifier 1016. When the physical identifiers 1016 and 1024 match, as shown in FIG. 10, the supply 1000 is authenticated. When the physical identifiers 1016 and 1024 do not match, the device 116c may interrupt printing at block 635, or generate another suitable exception. When a series of expected physical identifiers 1024 are generated and encoded by the device 116a, the device 116c can determine whether a threshold portion (e.g., 75%, or any other suitable portion) of determined physical identifiers 1016 match the expected physical identifiers 1024.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A supply of labels, comprising:
a fibrous liner layer having surface artifacts;
a printable substrate layer comprising a plurality of labels separated by respective gaps;
an adhesive between the fibrous liner layer and the printable substrate layer; and
a data carrier encoding a physical identifier derived from at least one optical measurement of the surface artifacts of the liner layer within at least one of the gaps.

* * * * *